(12) United States Patent
Kim et al.

(10) Patent No.: US 10,996,515 B2
(45) Date of Patent: May 4, 2021

(54) COLOR CONVERSION PANEL, DISPLAY DEVICE COMPRISING THE SAME AND MANUFACTURING METHOD OF THE COLOR CONVERSION PANEL

(71) Applicant: SAMSUNG DISPLAY CO., LTD., Yongin-si (KR)

(72) Inventors: Yong Seok Kim, Seoul (KR); Seong Gyu Kwon, Suwon-si (KR); Young Min Kim, Asan-si (KR); Ki Soo Park, Hwaseong-si (KR); Hae Il Park, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 161 days.

(21) Appl. No.: 15/243,712

(22) Filed: Aug. 22, 2016

(65) Prior Publication Data
US 2017/0059940 A1    Mar. 2, 2017

(30) Foreign Application Priority Data

Aug. 28, 2015  (KR) .................. 10-2015-0121947
Aug. 11, 2016  (KR) .................. 10-2016-0102545

(51) Int. Cl.
*G02F 1/13357*   (2006.01)
*G02F 1/1335*    (2006.01)

(52) U.S. Cl.
CPC .. *G02F 1/133617* (2013.01); *G02F 1/133512* (2013.01); *G02F 1/133509* (2013.01)

(58) Field of Classification Search
None
See application file for complete search history.

(56) References Cited

U.S. PATENT DOCUMENTS

| | | | |
|---|---|---|---|
| H001154  H * | 3/1993 | Gibson | 359/489.14 |
| 6,399,257 B1 * | 6/2002 | Shirota | G02B 5/201 347/106 |
| 2004/0253413 A1 * | 12/2004 | Baba | G02B 5/201 428/141 |
| 2010/0225858 A1 * | 9/2010 | Dong | G02F 1/133512 349/106 |
| 2011/0155296 A1 * | 6/2011 | Nakamura | G02B 5/201 156/67 |
| 2012/0229017 A1 * | 9/2012 | Nagai | C08F 8/30 313/498 |

(Continued)

FOREIGN PATENT DOCUMENTS

KR  10-2006-0125347 A   12/2006
KR  10-2009-0033891 A    4/2009

(Continued)

*Primary Examiner* — Edward J Glick
*Assistant Examiner* — David Y Chung
(74) *Attorney, Agent, or Firm* — Lewis Roca Rothgerber Christie LLP

(57) ABSTRACT

A color conversion panel according to an exemplary embodiment of the present invention includes an substrate, first, second, and third color conversion layers on the substrate and configured to emit lights of different colors, and a light blocking member between adjacent ones of the first, second, and third color conversion layers, wherein any one of the first, second, and third color conversion layers and the light blocking member is soluble.

19 Claims, 11 Drawing Sheets

(56) References Cited

U.S. PATENT DOCUMENTS

| | | | | |
|---|---|---|---|---|
| 2012/0287381 | A1* | 11/2012 | Li | G02F 1/133617 |
| | | | | 349/106 |
| 2013/0242228 | A1* | 9/2013 | Park | G02F 2/02 |
| | | | | 349/61 |
| 2013/0303777 | A1* | 11/2013 | Okamoto | C07F 15/002 |
| | | | | 548/103 |
| 2013/0335799 | A1* | 12/2013 | Yoon | G02B 26/02 |
| | | | | 359/227 |
| 2014/0125931 | A1* | 5/2014 | Niu | G02F 1/133514 |
| | | | | 349/106 |
| 2015/0228232 | A1* | 8/2015 | Lee | G09G 3/3607 |
| | | | | 345/88 |
| 2015/0285969 | A1* | 10/2015 | Kim | G02B 5/201 |
| | | | | 359/891 |
| 2016/0195773 | A1 | 7/2016 | Lee et al. | |
| 2016/0216545 | A1 | 7/2016 | Lee et al. | |
| 2016/0372528 | A1* | 12/2016 | Kamura | H01L 51/0096 |
| 2017/0123317 | A1* | 5/2017 | Kamura | G03F 7/039 |

FOREIGN PATENT DOCUMENTS

| | | |
|---|---|---|
| KR | 10-2010-0089606 A | 8/2010 |
| KR | 10-2016-0084557 | 7/2016 |

\* cited by examiner

COLOR CONVERSION PANEL, DISPLAY DEVICE COMPRISING THE SAME AND MANUFACTURING METHOD OF THE COLOR CONVERSION PANEL

CROSS-REFERENCE TO RELATED APPLICATION

This application claims priority to, and the benefit of, Korean Patent Application Nos. 10-2015-0121947 and 10-2016-0102545 respectively filed in the Korean Intellectual Property Office on Aug. 28, 2015 and Aug. 11, 2016, the entire contents of which are incorporated herein by reference.

BACKGROUND

1. Field

Embodiments of the present invention relate to a color conversion panel, a display device including the same, and a manufacturing method of a color conversion panel.

2. Description of the Related Art

Liquid crystal displays are currently one of the most widely used flat panel displays, and consist of a display device that includes two display panels on which electrodes are disposed, and a liquid crystal layer interposed therebetween, wherein the intensity of transmitted light is controlled by applying a voltage to the electrodes to rearrange liquid crystal molecules of the liquid crystal layer.

Among liquid crystal displays, a commonly used liquid crystal display has a structure in which field generating electrodes are provided at each of two display panels. One such structure includes a plurality of thin film transistors and pixel electrodes that are arranged in a matrix form at one display panel (hereinafter referred to as the "thin film transistor array panel"), color filters of red, green, and blue are disposed at the other display panel (hereinafter referred to as the "common electrode panel"), and a common electrode covers the entire surface thereof.

However, in a liquid crystal display, light loss occurs in a polarizer and a color filter. To reduce light loss and to implement a high efficiency liquid crystal display, a PL-liquid crystal display (Photo-Luminescent LCD) including a color conversion material has been proposed.

The above information disclosed in this Background section is only to enhance the understanding of the background of the invention, and therefore it may contain information that does not form the prior art.

SUMMARY

Embodiments of the present invention provide a display device with improved display quality by reducing or preventing color mixing in a color conversion panel, and a manufacturing method of a color conversion panel with reduced manufacturing cost and time by simplifying the manufacturing process of the color conversion panel.

A color conversion panel according to an exemplary embodiment of the present invention includes an substrate, first, second, and third color conversion layers on the substrate and configured to emit lights of different colors, and a light blocking member between adjacent ones of the first, second, and third color conversion layers, wherein any one of the first, second, and third color conversion layers and the light blocking member is soluble.

A material of the first, second, and third color conversion layers and the light blocking member may include a negative type photosensitive resin, and the light blocking member may be soluble.

The color conversion panel may further include a band pass filter on the first, second, and third color conversion layers, and an assistance metal layer on the band pass filter and overlapping the light blocking member.

A material of the first, second, and third color conversion layers and the light blocking member includes a negative type photosensitive resin, and the third color conversion layer may be soluble.

The color conversion panel may further include a band pass filter on the first and second color conversion layers, and under the third color conversion layer.

The color conversion panel may further include a blue light cutting filter on the substrate, and overlapping the first color conversion layer and the second color conversion layer.

A display device according to an exemplary embodiment of the present invention includes a display panel, and a color conversion panel on the display panel and including an substrate, first, second, and third color conversion layers between the substrate and the display panel and configured to emit differently colored light, and a light blocking member between respective adjacent ones of the first, second, and third color conversion layers, wherein any one of the first, second, and third color conversion layers and the light blocking member is soluble.

A material of the first, second, and third color conversion layers and the light blocking member may include a negative type photosensitive resin, and the light blocking member may be soluble.

The color conversion panel may further include a band pass filter between the first, second, and third color conversion layers and the display panel, and an assistance metal layer between the band pass filter and the display panel and overlapping the light blocking member.

A material of the first, second, and third color conversion layers and the light blocking member includes a negative type photosensitive resin, and the third color conversion layer may be soluble.

The display device may further include a band pass filter between the first and second color conversion layers and the display panel, and between the third color conversion layer and the substrate.

The display device may further include a blue light cutting filter between the substrate and the display panel, and overlapping the first color conversion layer and the second color conversion layer.

A manufacturing method of a color conversion panel according to an exemplary embodiment of the present invention includes forming first, second, and third color conversion layers on an substrate, coating a light blocking photosensitive resin on the first, second, and third color conversion layers, and ashing the light blocking photosensitive resin to form a light blocking member.

A material of the first, second, and third color conversion layer and the light blocking member may include a negative type photosensitive resin, and the light blocking member may be soluble.

The method may further include at least one of forming a band pass filter on the first, second, and third color conversion layers, and forming an assistance metal layer on the first, second, and third color conversion layers.

The method may further include forming a blue light cutting filter on the substrate, and overlapping the first and second color conversion layers.

A manufacturing method of a color conversion panel according to an exemplary embodiment of the present invention includes forming a light blocking member on an substrate, forming a first color conversion layer and a second color conversion layer between respective portions of the light blocking member, coating a color conversion resin on the substrate, on the light blocking member, on the first color conversion layer, and on the second color conversion layer, and ashing the color conversion resin to form a third color conversion layer.

The color conversion resin may include a negative type photosensitive resin, the first color conversion layer and the second color conversion layer may be insoluble, and the third color conversion layer may be soluble.

The method may further include forming a blue light cutting filter on the substrate and overlapping the first color conversion layer and the second color conversion layer.

The method may further include forming a band pass filter on the light blocking member, on the first color conversion layer, and on the second color conversion layer.

According to the manufacturing method of the color conversion panel, the manufacturing process is simplified, thereby reducing the manufacturing cost and time, and furthermore, according to the color conversion panel and the display device including the same, color mixing in the color conversion panel may be prevented, thereby providing improved display quality.

DETAILED DESCRIPTION

Figure 1:
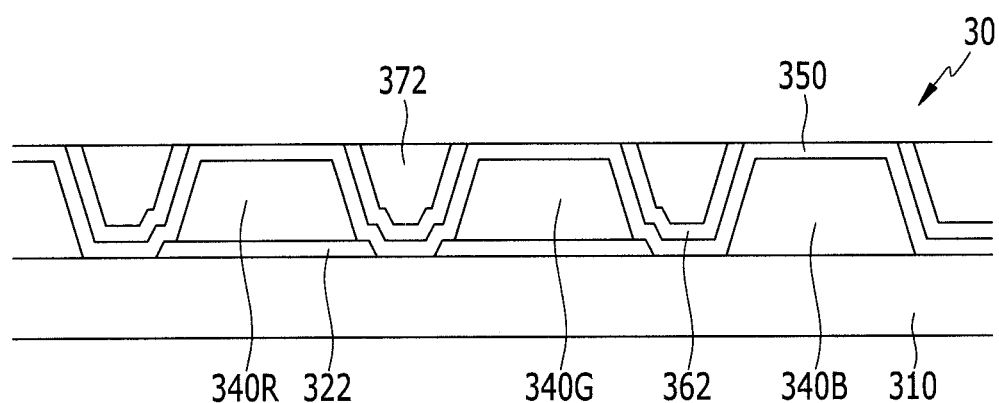
FIG. 1 is a cross-sectional view of a color conversion panel according to an exemplary embodiment of the present invention.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

A color conversion panel according to an exemplary embodiment of the present invention will be described with reference to FIG. 1. FIG. 1 is a cross-sectional view of a color conversion panel according to an exemplary embodiment of the present invention First, as shown in FIG. 1, a color conversion panel 30 includes a blue light cutting filter 322 disposed on a substrate 310. The blue light cutting filter 322 may overlap, or may be overlapped by, a first color conversion layer 340R and a second color conversion layer 340G.

In the present embodiment, separate portions of the blue light cutting filter 322 are disposed separately for each first color conversion layer 340R and each second color conversion layer 340G. That is, the blue light cutting filter 322 overlapping the first color conversion layer 340R, and the blue light cutting filter 322 overlapping the second color conversion layer 340G, may be independently formed.

The blue light cutting filter 322 may be formed by mixing one material among $BiO_2$, $ZnO$, and $Ce_2O_3$ with one material among $CaCO_3$, $ZrO_2$, $TiO$, and $Ar_2O_3$, although the present invention is not limited thereto, and other materials may be used to prevent blue light.

The blue light cutting filter 322 absorbs light with a wavelength band of about 400 nm to about 500 nm, such that only blue light in this wavelength band is prevented. In the present embodiment, transmittance of the blue light cutting filter 322 is about 5% or less at a wavelength of about 450 nm, is about 80% or more at a wavelength of about 535 nm, and about 90% or more at a wavelength of about 650 nm.

That is, the blue light cutting filter 322 prevents or reduces color mixing generated during the process in which blue light emitted from a light assembly 500 (shown in FIG. 3) is realized in a red (R) color and a green (G) color through the first color conversion layer 340R and the second color conversion layer 340G, respectively.

Next, a plurality of color conversion layers 340R, 340G, and 340B are disposed on the substrate 310 and on the blue light cutting filter 322, or disposed on the substrate 310.

Figure 3:
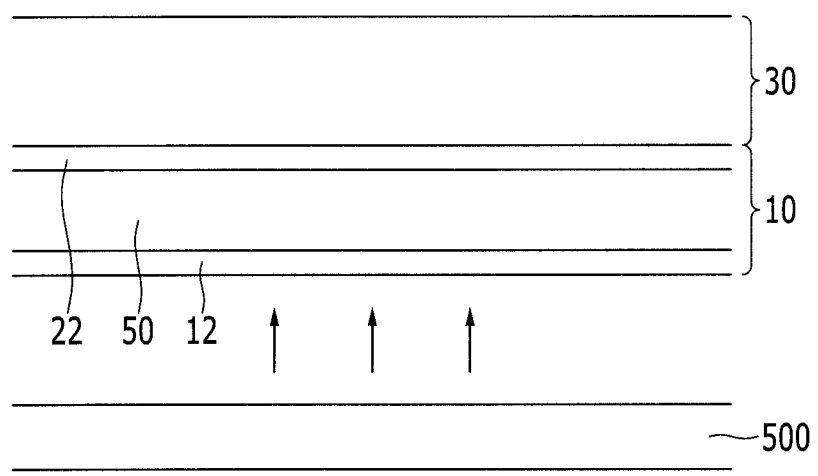
FIG. 3 is a schematic cross-sectional view of a display device of an exemplary embodiment of the present invention.

The first color conversion layer 340R may convert blue light supplied from the light assembly 500 shown in FIG. 3 into red. To do this, the first color conversion layer 340R may include a red phosphor, and the red phosphor may be at least one material among $(Ca, Sr, Ba)S$, $(Ca, Sr, Ba)_2Si_5N_8$, CASN ($CaAlSiN_3$), $CaMoO_4$, or $Eu_2Si_5N_8$.

The second color conversion layer 340G may convert blue light supplied from the light assembly 500 shown in FIG. 3 into green. The second color conversion layer 340G may include a green fluorescent substance, and the green fluorescent substance may be at least one material among yttrium aluminum garnet (YAG), $(Ca, Sr, Ba)_2SiO_4$, $SrGa_2S_4$, BAM, α-SiAlON, β-SiAlON, $Ca_3Sc_2Si_3O_{12}$, $Tb_3Al_5O_{12}$, $BaSiO_4$, CaAlSiON, or $(Sr_{1-x}Ba_x)Si_2O_2N_2$, where x may be a number between 0 to 1.

In addition, the first color conversion layer 340R and the second color conversion layer 340G may include a quantum dot for converting the color. The quantum dot may be selected from a Group II-VI compound, a Group III-V compound, a Group IV-VI compound, a Group IV element, a Group IV compound, and/or a combination thereof.

The Group II-VI compound may be selected from the group consisting of a binary compound selected from the group consisting of CdSe, CdTe, ZnS, ZnSe, ZnTe, ZnO, HgS, HgSe, HgTe, MgSe, MgS, and/or a mixture thereof; a tertiary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and/or a mixture thereof; and/or a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and/or a mixture thereof. The Group III-V compound may be selected from the group consisting of a binary compound selected from the group consisting of GaN, GaP, GaAs, GaSb, AlN, AlP, AlAs, AlSb, InN, InP, InAs, InSb, and/or a mixture thereof; a tertiary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and/or a mixture thereof; and/or a quaternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and/or a mixture thereof. The Group IV-VI compound may be selected from the group consisting of a binary compound selected from the group consisting of SnS, SnSe, SnTe, PbS, PbSe, PbTe, and/or a mixture thereof; a tertiary compound selected from the group consisting of SnSeS, SnSeTe, SnSTe, PbSeS, PbSeTe, PbSTe, SnPbS, SnPbSe, SnPbTe, and/or a mixture thereof; and/or a quaternary compound selected from the group consisting of SnPbSSe, SnPbSeTe, SnPbSTe, and/or a mixture thereof. The Group IV element may be selected from the group consisting of Si, Ge, and/or a mixture thereof. The Group IV compound may be a binary compound selected from the group consisting of SiC, SiGe, and/or a mixture thereof.

In the present embodiment, the binary compound, the tertiary compound, and/or the quaternary compound may exist in particles at a uniform concentration, or the concentration distribution may exist in the same particle in different states. Further, the color conversion layer may have a core/shell structure where one quantum dot surrounds another quantum dot. An interface between the core and the shell may have a concentration gradient, such that the concentration of an element existing in the shell is gradually reduced as it nears the center thereof.

The quantum dot may have a full width of half maximum (FWHM) of an emission wavelength spectrum of about 45 nm or less, of about 40 nm or less, or of about 30 nm or less. In this range, color purity or color reproducibility may be improved. Also, the light emitted through the quantum dot is irradiated in all directions, thereby improving the light viewing angle.

Further, the form of the quantum dot may be a form generally used in the art, and is not particularly limited, but more specifically, forms such as spherical, pyramidal, multi-arm-shaped, or cubic nanoparticles, nanotubes, nanowires, nanofibers, and nanoplate-shaped particles may be used.

The third color conversion layer 340B is made of a transparent polymer, and blue light supplied from the light assembly 500 is transmitted to represent blue. The third color conversion layer 340B corresponding to the region emitting blue includes a material emitting incident blue with a separate phosphor or quantum dot (as one example, a polymer such as a photosensitive resin, TiO2).

According to an exemplary embodiment of the present invention, the first color conversion layer 340R, the second color conversion layer 340G, and the third color conversion layer 340B may be formed by exposing and developing a negative type photosensitive resin, the plurality of color conversion layers 340R, 340G, and 340B may be insoluble, and a cross section of each color conversion layer may be a tapered shape.

Next, the band pass filter 350 is disposed on the plurality of color conversion layers 340R, 340G, and 340B. The band pass filter 350 overlaps the plurality of color conversion layers 340R, 340G, and 340B, and also contacts the substrate 310 between the color conversion layers 340R, 340G, and 340B.

The band pass filter 350 may more effectively supply the light incident from the light assembly 500, and the band pass filter 350 may be omitted in other embodiments.

Next, the assistance metal layer 362 is disposed on the band pass filter 350, and is located between the adjacent color conversion layers 340R, 304G, and 340B. The assistance metal layer 362 may be a metal material reflecting light and again reflects light emitted in the direction of the assistance metal layer 362 to the direction of the color conversion layers 340R, 340G, and 340B, thereby increasing the amount of light emitted to the user.

Next, the light blocking member 372 is disposed on the band pass filter 350 (e.g., on the assistance metal layer 362), and is located between the plurality of color conversion layers 340R, 340G, and 340B.

Referring to FIG. 1, the light blocking member 372 defines regions corresponding to locations of the first color conversion layer 340R, the second color conversion layer 340G, and the third color conversion layer 340B, and the first color conversion layer 340R, the second color conversion layer 340G, and the third color conversion layer 340B are between respective portions of the light blocking member 372 (between respective light blocking members 372).

The light blocking member 372 may be formed by ashing a negative type light blocking photosensitive resin. The light blocking member 372 formed through the ashing of the light blocking photosensitive resin is soluble, and the cross section of the light blocking member 372 may be a reverse tapered shape (e.g., may be tapered in a direction that is opposite to the tapered direction of the color conversion layers 340R, 340G, and 340B). Also, an upper surface of the light blocking member 372 may be concave depending on the manufacturing process.

The term "soluble" refers to a property in which a material is dissolved by a solution (e.g., a developer). That is, in the case of the negative type photosensitive resin, the region where the exposure is performed on the photosensitive resin becomes insoluble due to crosslinking generation by the exposure. In contrast, the region in which the exposure is not performed maintains solubility, and the material may be developed by the solution. Accordingly, because the additional exposure does not conduct the light blocking photosensitive resin according to an exemplary embodiment of the present invention, crosslinking having insolubility is not included, and solubility may be obtained.

Also, the term "the reverse tapered shape" indicates a shape, as shown in FIG. 1, in which the upper surface of the light blocking member 372 is wider than the lower surface.

Meanwhile, the above-described color conversion panel 30 has a substantially flat surface. Accordingly, the light blocking member 372 is also able to effectively prevent color mixture generated between adjacent color conversion layers 340R, 304G, and 340B.

Figure 2:
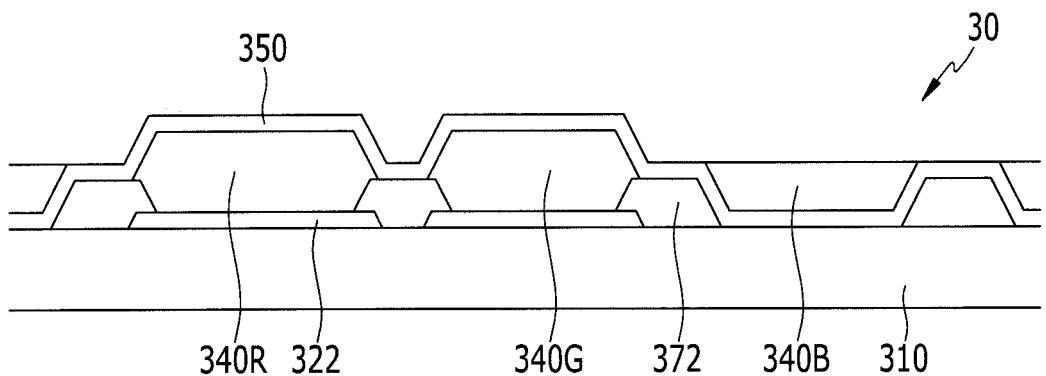
FIG. 2 is a cross-sectional view of a color conversion panel according to an exemplary embodiment of the present invention.

Next, the color conversion panel according to an exemplary embodiment of the present invention will be described with reference to FIG. 2. FIG. 2 is a cross-sectional view of a color conversion panel according to an exemplary embodiment of the present invention. The description of the same and similar constituent elements as described above will be omitted.

First, as shown in FIG. 2, the color conversion panel 30 includes the blue light cutting filter 322 on the substrate 310. The blue light cutting filter 322 may overlap (e.g., may be overlapped by) the first color conversion layer 340R and the second color conversion layer 340G.

In the present embodiment, portions of the blue light cutting filter 322 are separately disposed for each first color conversion layer 340R and each second color conversion layer 340G. That is, the blue light cutting filter 322 overlapping the first color conversion layer 340R, and the blue light cutting filter 322 overlapping the second color conversion layer 340G, may be independently formed.

The blue light cutting filter 322 absorbs light with a wavelength band of about 400 nm to about 500 nm, such that only blue light having this wavelength band is prevented. In the present embodiment, transmittance of the blue light cutting filter 322 is about 5% or less at a wavelength of about 450 nm, about 80% or more at a wavelength of about 535 nm, and about 90% or more at a wavelength of about 650 nm.

That is, the blue light cutting filter 322 prevents color mixing from being generated during the process in which blue light emitted from a light assembly 500 (shown in FIG. 3) is realized in a red (R) color and a green (G) color through the first color conversion layer 340R and the second color conversion layer 340G, respectively.

Next, the light blocking member 372 is disposed on the substrate 310, and is disposed between the plurality of color conversion layers 340R, 340G, and 340B, which are described later.

Referring to FIG. 2, the light blocking member 372 defines regions corresponding to the first color conversion layer 340R, the second color conversion layer 340G, and the third color conversion layer 340B, and the first color conversion layer 340R, the second color conversion layer 340G, and the third color conversion layer 340B are disposed between the light blocking member 372 (e.g., between respective portions of the light blocking member 372).

The light blocking member 372 is formed by exposing and developing the negative type light blocking photosensitive resin, such that the light blocking member 372 is insoluble. Also, the cross section of the formed light blocking member 372 may be a normal tapered shape (e.g., a shape wherein a base of the light blocking member 372 is wider than a top thereof).

Next, a plurality of color conversion layers 340R, 340G, and 340B are disposed on the light blocking member 372.

The first color conversion layer 340R may convert blue light supplied from the light assembly 500 into red. For this, the first color conversion layer 340R may include a red phosphor, and the red phosphor may be at least one material among (Ca, Sr, Ba)S, $(Ca, Sr, Ba)_2Si_5N_8$, $(CaAlSiN_3)$, $CaMoO_4$, or $Eu_2Si_5N_8$.

The second color conversion layer 340G may convert blue light supplied from the light assembly 500 shown in FIG. 3 into green. The second color conversion layer 340G may include a green fluorescent substance, and the green fluorescent substance may be at least one material among yttrium aluminum garnet (YAG), $(Ca, Sr, Ba)_2SiO_4$, $SrGa_2S_4$, BAM, α-SiAlON, β-SiAlON, $Ca_3Sc_2Si_3O_{12}$, $Tb_3Al_5O_{12}$, $BaSiO_4$, CaAlSiON, or $(Sr_{1-x}Ba_x)Si_2O_2N_2$, where x may be a number between 0 to 1.

Also, the first color conversion layer 340R and the second color conversion layer 340G may include a quantum dot converting the color. The quantum dot may be selected from a Group II-VI compound, a Group III-V compound a Group IV-VI compound, a Group IV element, a Group IV compound, and a combination thereof.

According to the exemplary embodiment shown in FIG. 2, the first color conversion layer 340R and second color conversion layer 340G may be formed by exposing and developing the negative type photosensitive resin, and the plurality of color conversion layers 340R and 340G may be insoluble. Also, the cross section of the first color conversion layer 340R and the second color conversion layer 340G may be normally tapered.

The third color conversion layer 340B is formed of a transparent polymer, and blue light supplied from the light assembly 500 is transmitted to display a blue color. The third color conversion layer 340B corresponding to the region emitting blue includes a material emitting incident blue light with a separate phosphor or quantum dot (as one example, a polymer such as a photosensitive resin, $TiO_2$).

According to the exemplary embodiment shown in FIG. 2, the third color conversion layer 340B may be formed by ashing the negative type photosensitive resin, and the third color conversion layer 340B is soluble. Also, the cross section of the third color conversion layer 340B may be reversely tapered, and may have an upper surface that is concave, depending on an exemplary embodiment.

The term "soluble" refers to a property in which a material is dissolved by a predetermined solution (e.g., the developer). That is, in the case of the negative type photosensitive resin, the region where the exposure is performed on the photosensitive resin becomes insoluble due to crosslinking generation by the exposure. In contrast, the region in which the exposure is not performed maintains solubility and the material may be developed by the predetermined solution. Accordingly, because the additional exposure does not conduct the light blocking photosensitive resin according to an exemplary embodiment of the present invention, crosslinking having insolubility is not included and solubility may be obtained.

Also, the term "the reverse tapered shape" indicates a shape, as shown in FIG. 2, in which the upper surface of the third color conversion layer 340B is wider than the lower surface.

Next, the band pass filter 350 is disposed on the first and second color conversion layers 340R and 340G, and is disposed under the third color conversion layer 340B. The present embodiment depends on the sequence of the manufacturing process, and thus, the present invention is not limited thereto, and the band pass filter 350 may be disposed under one among the first, second, and third color conversion layers 340R, 340G, and 340B, and may be disposed on others of the color conversion layer.

Because the band pass filter 350 is disposed on the entire area of the substrate 310, the band pass filter 350 overlaps the plurality of color conversion layers 340R, 340G, and 340B, or may also contact the substrate 310 at areas between respective ones of the color conversion layers 340R, 340G, and 340B, or may also contact the light blocking member 372 between respective ones of the color conversion layers 340R, 340G, and 340B. The band pass filter 350 may effectively supply light supplied from the light assembly 500, and the band pass filter 350 may be omitted in other embodiments.

Figure 4:
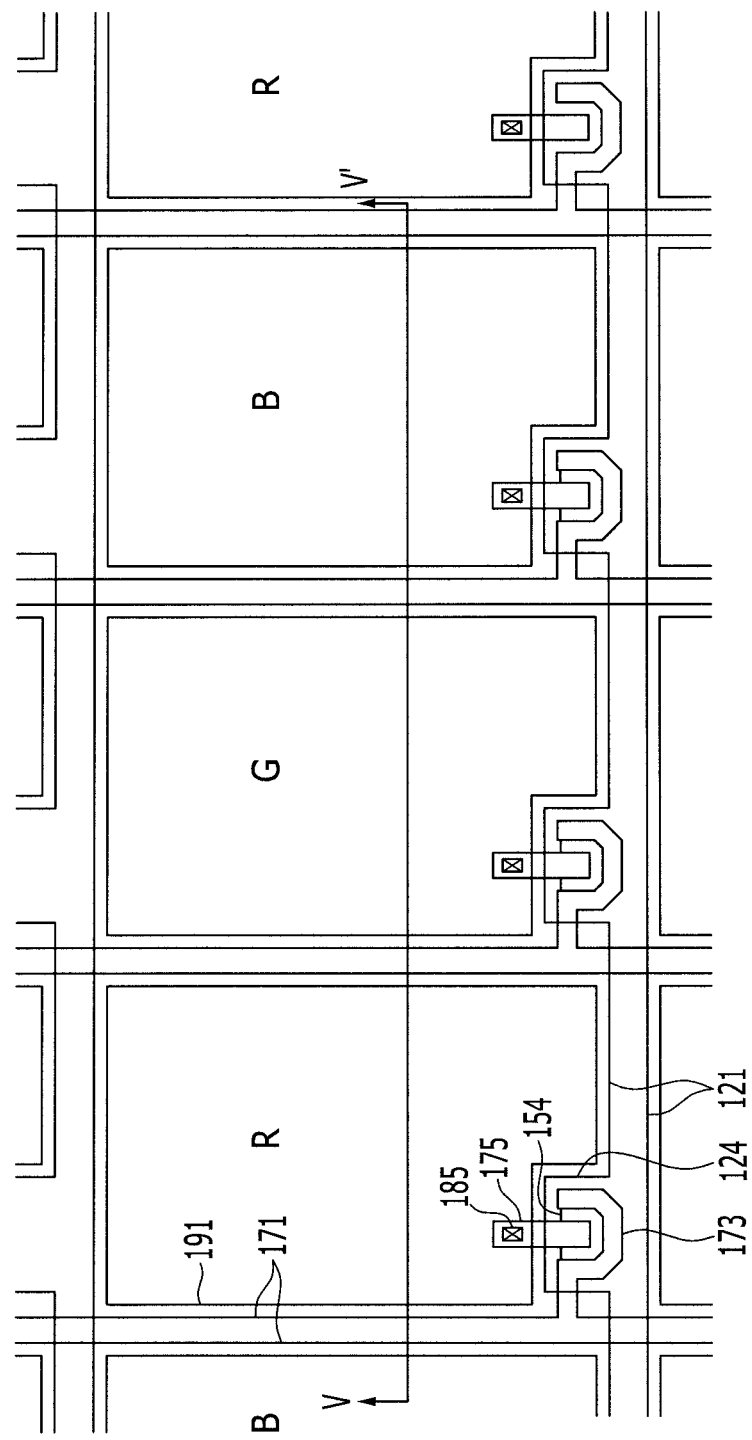
FIG. 4 is a top plan view of a plurality of adjacent pixels in a display device according to an exemplary embodiment of the present invention.
Figure 5:
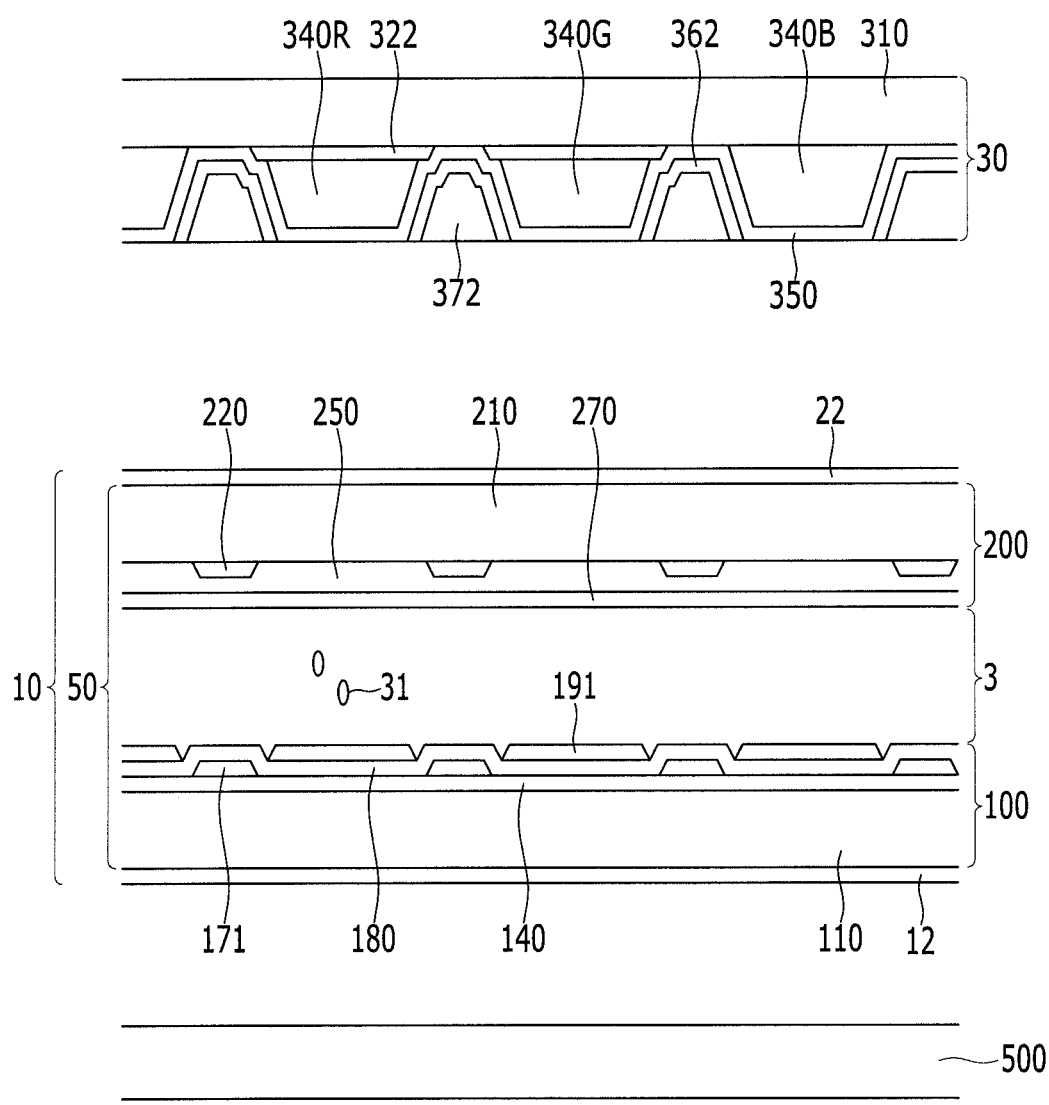
FIG. 5 is a cross-sectional view of the display device of FIG. 4 taken along the line V-V.

Next, the display device according to an exemplary embodiment of the present invention will be described with reference to FIG. 3 to FIG. 5, as well as FIG. 1. FIG. 3 is a schematic cross-sectional view of a display device of an exemplary embodiment of the present invention, FIG. 4 is a top plan view of a plurality of adjacent pixels in a display device according to an exemplary embodiment of the present invention, and FIG. 5 is a cross-sectional view of the display device of FIG. 4 taken along the line V-V'.

Next, the display device according to an exemplary embodiment of the present invention will be described with reference to FIG. 3, and the present embodiment includes the color conversion panel 30, the display panel 10, and the light assembly 500. The color conversion panel 30 included in the display device according to an exemplary embodiment of the present invention is the same or similar to the above-described color conversion panel 30, such that a duplicate description thereof is omitted.

Next, the display panel 10 disposed at the rear surface of the color conversion panel 30 may include a liquid crystal panel 50 for displaying an image, and polarizers 12 and 22 on respective surfaces of the liquid crystal panel 50. A first polarizer 12 and a second polarizer 22 for polarization of the light incident from the light assembly 500 are each at a respective surface of the liquid crystal panel 50. The first polarizer 12 may face the light assembly 500, and the second polarizer 22 may face or may contact the color conversion panel 30.

The light assembly 500 includes a light source at the rear surface of the first polarizer 12, and is configured to generate light, and a light guide may be included to receive the light and to guide the received light in the direction of the display panel 10 and the color conversion panel 30.

As one example, the light assembly 500 may include at least one light emitting diode (LED), and may be a blue light emitting diode (LED). The light source according to the present invention may be an edge type light assembly on at least one side of the light guide plate, or may be a direct type where the light source of the light assembly 500 is disposed in a direct lower portion of the light guide plate. However, the light source is not limited thereto.

Next, the above-described display panel 10 will be described in further detail with reference to FIG. 4 and FIG. 5. The color conversion panel 30 shown in FIG. 4 and FIG. 5 is the same as the color conversion panel 30 described with reference to FIG. 1, and thus a duplicate description thereof is omitted. Further, the color conversion panel of the present embodiment is not limited to the color conversion panel 30 of FIG. 1, and may be the color conversion panel 30 shown in FIG. 2 or a variation of an exemplary embodiment thereof.

First, the liquid crystal panel 50 at the rear surface of the color conversion panel 30 includes a lower panel 100 including a thin film transistor to display the image, an upper panel 200 facing the lower panel 100 and including a second substrate 210, and a liquid crystal layer 3 between the lower panel 100 and the upper panel 200.

The polarizers 12 and 22 are each located at a respective surface of the liquid crystal panel 50, and the polarizer 12 may use at least one of a coating-type polarizer or a wire grid polarizer. The polarizer 12 may be on one surface of the lower panel 100 by various methods, such as a film type, a coating type, an adhering type, and the like. However, this description is one example, and the present invention is not limited thereto.

A plurality of pixel electrodes are arranged in a matrix shape on a first substrate 110 included in the lower panel 100.

Disposed on the first substrate 110 are a gate line 121 extending in a row direction and including a gate electrode 124, a gate insulating layer 140 on the gate line 121, a semiconductor layer 154 on the gate insulating layer 140, a data line 171 on the semiconductor layer 154, extending in a column direction, and including a source electrode 173 and a drain electrode 175, a passivation layer 180 on the data line 171 and on the drain electrode 175, and a pixel electrode 191 electrically and physically connected to the drain electrode 175 through a contact hole 185.

The semiconductor layer 154 on the gate electrode 124 forms a channel layer in a region that is exposed by the source electrode 173 and the drain electrode 175, and the gate electrode 124, the semiconductor layer 154, the source electrode 173, and the drain electrode 175 collectively form one thin film transistor.

Next, a light blocking member(s) 220 is disposed between the second substrate 210 and the first substrate 110. A planarization layer 250 providing a flat surface may be disposed between the light blocking member 220 and the first substrate 110, and a common electrode 270 is disposed between the planarization layer 250 and the first substrate 110. The planarization layer 250 may be omitted in other embodiments of the present invention. The common electrode 270 may be disposed in the lower panel 100.

The common electrode 270 receiving a common voltage forms an electric field with the pixel electrode 191, and arranges liquid crystal molecules 31 in the liquid crystal layer 3.

The liquid crystal layer 3 includes a plurality of liquid crystal molecules 31, and the arrangement direction of the liquid crystal molecules 31 is controlled by the electric field between the pixel electrode 191 and the common electrode 270. According to the arrangement of the liquid crystal molecules 31, transmittance of light received from a light assembly 500 may be controlled to display an image.

A lower alignment layer may be disposed between the pixel electrode 191 and the liquid crystal layer 3, and an upper alignment layer may be disposed between the common electrode and the liquid crystal layer 3. The present specification describes a liquid crystal display panel where a liquid crystal panel forms a vertical electric field, but is not limited thereto, and the liquid crystal display panel may be a display device such as a plasma display panel (PDP), an organic light emitting diode display (OLED), a surface conduction electron-emitter display (SED), a field emission display (FED), a vacuum fluorescent display (VFD), and an E-paper.

The display device according to the present embodiment may improve the emission ratio and the color reproducibility through the color conversion panel 30 on the display panel 10.

Figure 6:
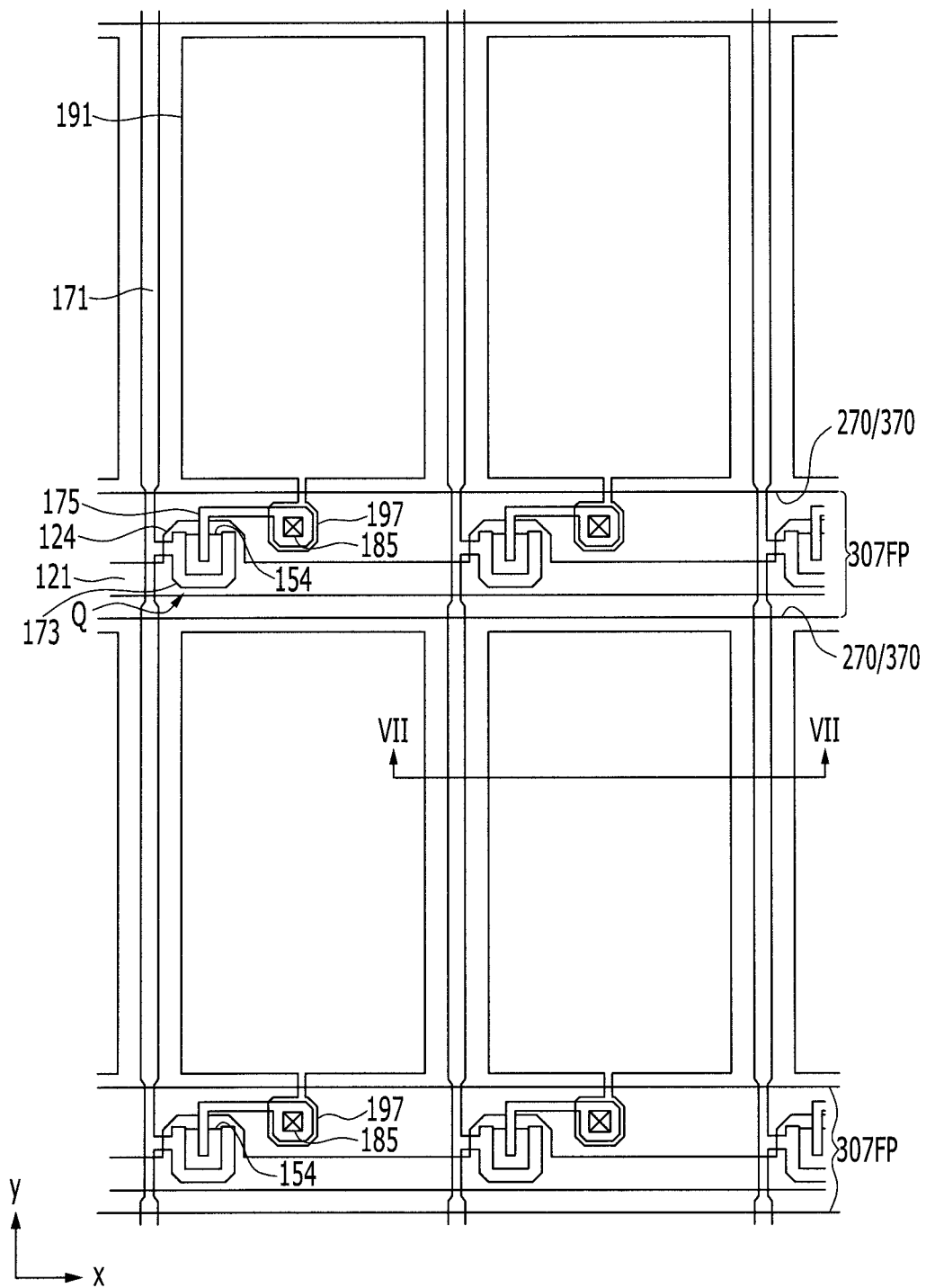
FIG. 6 is a top plan view of a plurality of adjacent pixels in a display device according to an exemplary embodiment of the present invention.

Next, the display device according to an exemplary embodiment of the present invention will be described in detail with reference to FIG. 6 and FIG. 7, as well as FIG. 1. FIG. 6 is a top plan view of a plurality of adjacent pixels in a display device according to an exemplary embodiment of the present invention, and FIG. 7 is a cross-sectional view of the display device of FIG. 6 taken along the line VII-VII.

Figure 7:
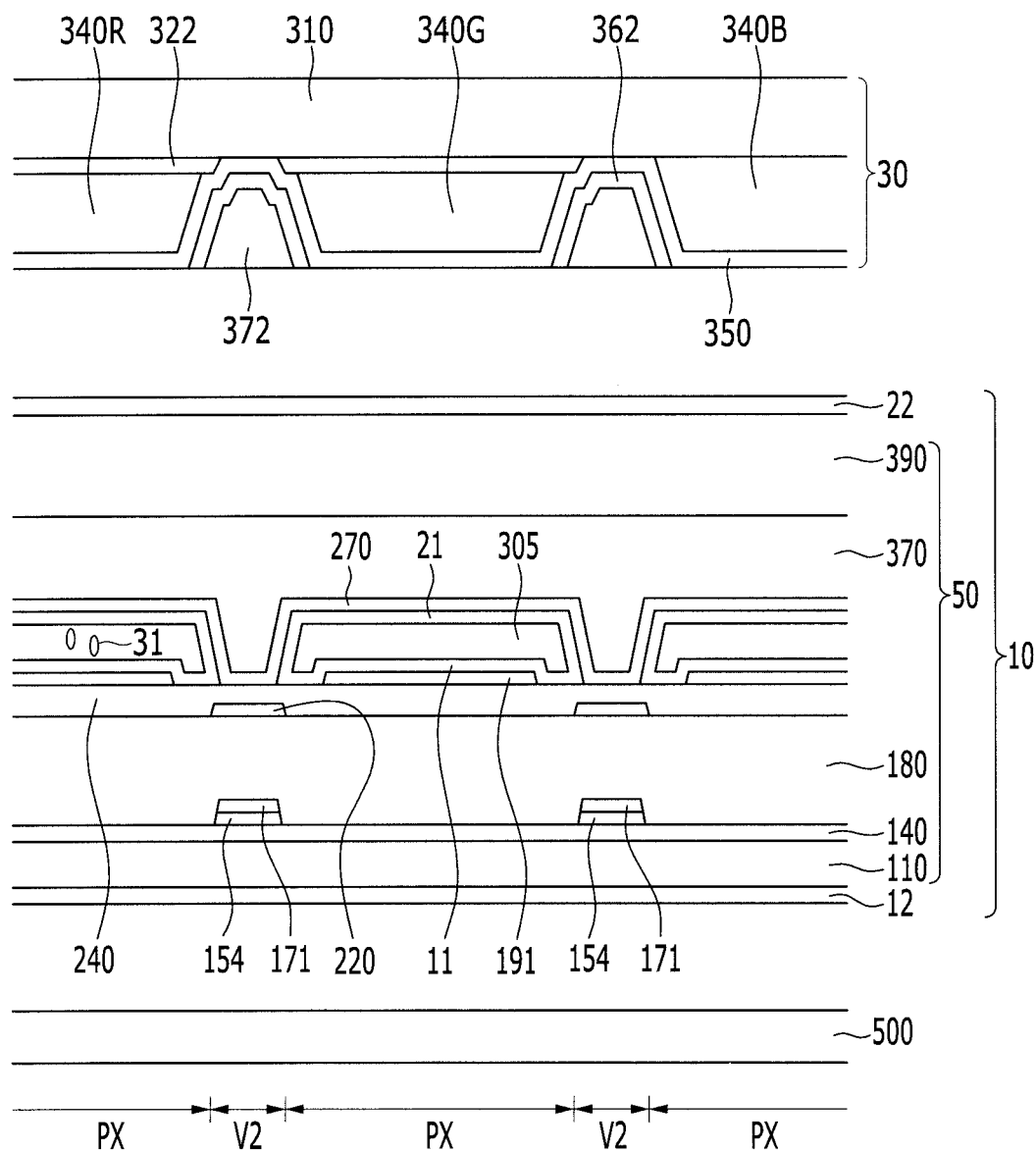
FIG. 7 is a cross-sectional view of the display device of FIG. 6 taken along the line VII-VII.

Referring to FIG. 6 and FIG. 7, the display device according to an exemplary embodiment of the present invention includes the display panel 10, the color conversion panel 30, and the light assembly 500. The display panel 10 may be disposed on the light assembly 500, the color conversion panel 30 may be disposed on the display panel 10, though the present invention is not limited thereto, and the up/down position may be changed depending on the exemplary embodiment of the present invention.

The color conversion panel 30 and the light assembly 500 included in the display device according to an exemplary embodiment of the present invention is the same as the above-described exemplary embodiment, such that a duplicate description thereof is omitted. Also, the color conversion panel 30 shown in FIG. 7 is the same as the color conversion panel 30 shown in FIG. 1, however the present embodiment is not limited thereto, and the color conversion panel may be the color conversion panel 30 shown in FIG. 2 or a variation embodiment.

First, the display panel 10 according to an exemplary embodiment of the present invention includes the liquid crystal panel 50 and the polarizers 12 and 22 on respective surfaces of the liquid crystal panel 50. In this case, the polarizer 12 may use at least one of the coating type polarizer and the wire grid polarizer, and the polarizers 12 and 22 may be on the surfaces of the liquid crystal panel 50 by various methods, such as the film type, the coating type, and the adhering type. However, this description is one example and it is not limited thereto.

FIG. 6 shows a 2×2 pixel part as a center part of the plurality of pixels respectively corresponding to a plurality of micro cavities, and these pixels may be repeated vertically and horizontally in the display device according to an embodiment of the present invention.

Referring to FIG. 6 to FIG. 7, in the liquid crystal panel 50 according to an embodiment of the present invention, a gate line 121 and a storage electrode line 131 are formed on a substrate 110.

The gate line 121 includes a gate electrode 124. A gate insulating layer 140 is disposed on the gate line 121. On the gate insulating layer 140, a semiconductor layer 154 is disposed under a data line 171 and a semiconductor layer 154 may be disposed under source/drain electrodes 173 and 175 and in a channel part of a thin film transistor Q.

Data conductors 171, 173, and 175, including the source electrode 173, the data line 171 connected to the source electrode 173, and the drain electrode 175, are disposed on the semiconductor layers 154 and the gate insulating layer 140.

The gate electrode 124, the source electrode 173, and the drain electrode 175 form the thin film transistor Q along the semiconductor layer 154, and the channel of the thin film transistor Q is formed in the semiconductor layer 154 between the source electrode 173 and the drain electrode 175.

A first passivation layer 180 may be disposed on the data conductors 171, 173, and 175 and the exposed part of the semiconductor layer 154. The first passivation layer 180 may include an inorganic insulator such as silicon nitride (SiNx) and silicon oxide (SiOx) or an organic insulator.

A light blocking member 220 and a second passivation layer 240 are disposed on the first passivation layer 180.

The light blocking member 220 is disposed in a lattice structure having openings corresponding to an area displaying the image, and made of a material through which light does not pass.

The second passivation layer 240 may include an inorganic insulator such as silicon nitride (SiNx) and silicon oxide (SiOx) or an organic insulator.

The first and second passivation layers 180 and 240 and the light blocking member 220 have a contact hole 185 exposing the drain electrode 175.

The pixel electrode 191 is disposed on the second passivation layer 240. The pixel electrode 191 may be made of a transparent conductive material such as ITO or IZO.

The overall shape of the pixel electrode 191 is planar shape.

The pixel electrode 191 includes a protrusion 197 which is physically and electrically connected to the drain electrode 175 on the protrusion 197 through the contact hole 185, thereby receiving the data voltage from the drain electrode 175.

The thin film transistor Q and the pixel electrode 191 described above are only described as examples, and the structure of the thin film transistor and design of the pixel electrode are not limited to the structure described in the present embodiment, but may be modified to be applied based on the description according to an embodiment of the present invention.

A lower alignment layer 11 is disposed on the pixel electrode 191, and the lower alignment layer 11 may be a vertical alignment layer. The lower alignment layer 11 may include at least one of the materials generally used as a liquid crystal alignment layer, such as polyamic acid, polysiloxane, polyimide, or the like.

An upper alignment layer 21 is disposed to face the lower alignment layer 11, and the microcavities 305 are disposed between the lower alignment layer 11 and the upper alignment layer 21. Liquid crystal molecules 31 are injected in the microcavities 305 to form the liquid crystal layer 3, and the microcavities 305 have an inlet part 307FP. A plurality of microcavities 305 may be disposed along the column direction of the pixel electrode 191, i.e., the vertical direction. In the present embodiment, an alignment material forming the alignment layers 11 and 21 and the liquid crystal molecule 31 including the liquid crystal molecules may be injected to the microcavities 305 by using a capillary force. In the present embodiment, the lower alignment layer 11 and the upper alignment layer 21 are only divided depending on the position, as shown in FIG. 7, and may be connected to each other. The lower alignment layer 11 and the upper alignment layer 21 may be simultaneously formed.

The lower alignment layer 11 and the upper alignment layer 21 described above are only described as examples, and the lower and the upper alignment layer material are not limited to the structure described in the present embodiment, but may be modified to be applied based on the description according to an embodiment of the present invention.

The microcavities 305 are divided in the vertical direction by a plurality of liquid crystal inlets 307FP disposed at the portion overlapping the gate line 121 to form the plurality of microcavities 305, and the plurality of microcavities 305 may be disposed along the column direction of the pixel electrode 191, i.e., the vertical direction. Also, the microcavities 305 are divided by a partition in the X-axis direction to form a plurality of microcavities 305, and the plurality of microcavities 305 may be formed along the X-axis direction of the pixel electrode 191. The plurality of the microcavities 305 may correspond to one pixel area, or two or more, and the pixel area may correspond to a region displaying the image.

The common electrode 270 is disposed on the upper alignment layer 21. The common electrode 270 receives the common voltage and generates an electric field together with the pixel electrode 191, to which the data voltage is applied, to determine a direction in which the liquid crystal molecules 31 disposed at the microcavities 305 between the two electrodes are inclined The common electrode 270 forms the capacitor along with the pixel electrode 191 such that the applied voltage is maintained after the thin film transistor is turned-off.

In the present embodiment, the common electrode 270 is disposed on the microcavities 305, however the common electrode 270 may be disposed under the microcavities 305 as another embodiment to realize the liquid crystal driving according to a coplanar electrode (CE) mode.

A roof layer 370 is disposed on the common electrode 270. The roof layer 370 serves as a support so that the microcavity 305, which is a space between the pixel electrode 191 and the common electrode 270, is formed. The roof layer 370 may include a photoresist, or other organic materials.

In the present embodiment, a partition is disposed between the microcavities 305 adjacent in the horizontal direction. The partition may be formed along the Y-axis direction as the direction in which the data line 171 extends and may be covered by the roof layer 370. The partition is filled with the common electrode 270, the roof layer 370 and the microcavities 305 may be divided or defined as this structure forms a partition wall.

A capping layer 390 is disposed on the roof layer 370. The capping layer 390 includes an organic material or inorganic material. In the present embodiment, the capping layer 390 may be formed in the liquid crystal inlet 307FP as well as on the roof layer 370. In this case, the capping layer 390 may cover the inlet part 307 of the microcavities 305 exposed by the liquid crystal inlet 307FP. In the display device according to an exemplary embodiment of the present invention, the light emission ratio is improved and color reproducibility is improved, thereby providing the display device with excellent display quality.

Figure 8:
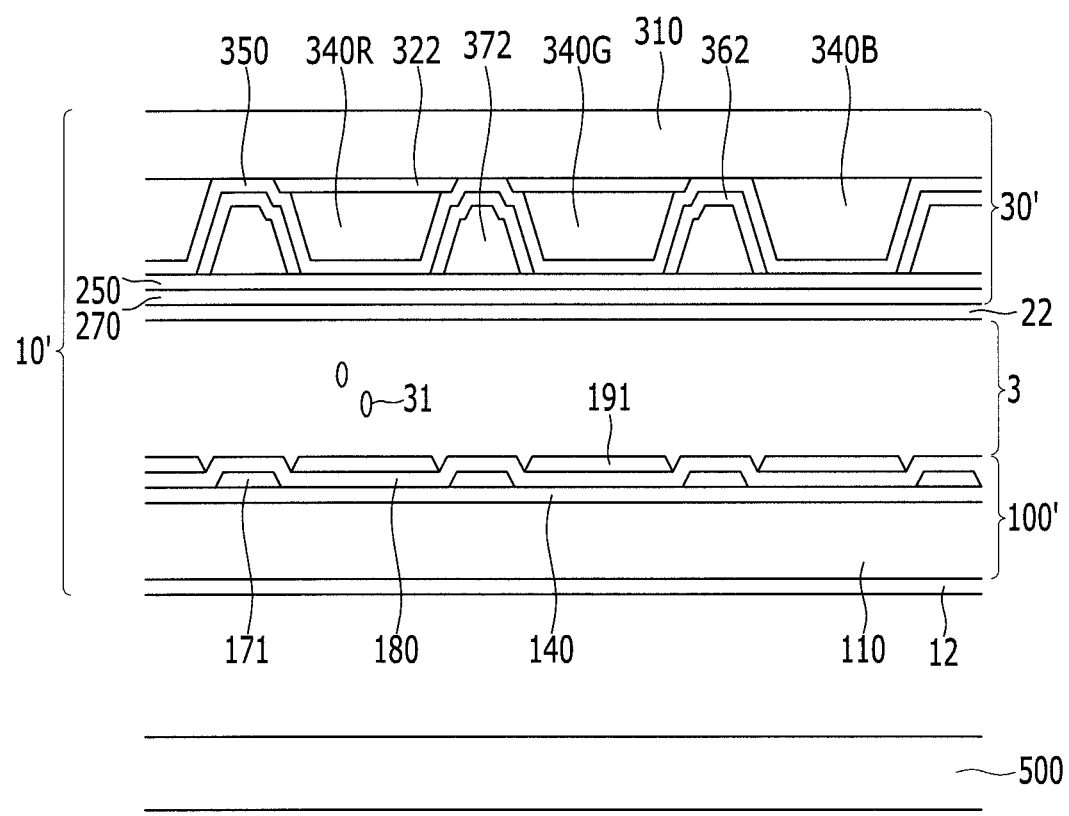
FIG. 8 is a cross-sectional view of a display device according to an exemplary embodiment of the present invention.

Next, the display device according to an exemplary embodiment of the present invention will be described with reference to FIG. 8. FIG. 8 is a cross-sectional view of a display device according to an exemplary embodiment of the present invention.

The display device according to an exemplary embodiment of the present invention shown in FIG. 8 includes a display panel 10' and a light assembly 500. The display panel 10' may be disposed on the light assembly 500, though it is not limited thereto, and the up/down position may be changed depending on the exemplary embodiment of the present invention.

The display panel 10' according to an exemplary embodiment of the present invention includes the thin film transistor array panel 100', the color conversion panel 30' facing and separated from the thin film transistor array panel 100', and the liquid crystal layer 3 between the thin film transistor array panel 100' and the color conversion panel 30' and including the liquid crystal molecules 31. That is, in the display panel 10' according to an exemplary embodiment of the present invention, unlike in the above-described exemplary embodiment, the color conversion panel 30' forms part of the display panel 10'.

The display panel 10' may further include the first polarizer 12 at one surface of the thin film transistor array panel 100', and the second polarizer 22 at one surface of the color conversion panel 30'.

The thin film transistor array panel 100' according to the present exemplary embodiment is the same as the lower panel 100 of FIG. 4 to FIG. 5, and the color conversion panel 30' is similar to the color conversion panel 30 of FIG. 1, such that it will be described with reference to FIG. 1, FIG. 4, and FIG. 5, as well as FIG. 8.

First, the plurality of pixel electrodes are arranged in a matrix shape on the first substrate 110 included in the thin film transistor array panel 100'.

Referring to FIG. 4, FIG. 5, and FIG. 7, located on the first substrate 110 are the gate line 121 extending in the row direction and including the gate electrode 124, the gate insulating layer 140 on the gate line 121, the semiconductor layer 154 on the gate insulating layer 140, the data line 171 on the semiconductor layer 154, extending in a column direction, and including the source electrode 173 and the drain electrode 175, the passivation layer 180 on the data line 171 and the drain electrode 175, and the pixel electrode 191 electrically and physically connected to the drain electrode 175 through the contact hole 185.

The semiconductor layer 154 on the gate electrode 124 forms the channel layer in the region that is exposed by the source electrode 173 and the drain electrode 175, and the gate electrode 124, the semiconductor layer 154, the source electrode 173, and the drain electrode 175 form one thin film transistor.

Next, the blue light cutting filter 322 is disposed between the substrate 310 and the first substrate 110. The blue light cutting filter 322 may overlap the first color conversion layer 340R and the second color conversion layer 340G. The blue light cutting filter 322 overlapping the first color conversion layer 340R, and the blue light cutting filter 322 overlapping the second color conversion layer 340G, are disposed separately.

The blue light cutting filter 322 reduces or prevents color mixing during the process in which blue light emitted from a light assembly 500 is realized in a red (R) color and a green (G) color through the first color conversion layer 340R and the second color conversion layer 340G, respectively.

Next, a plurality of color conversion layers 340R, 340G, and 340B are between the substrate 310 and the first substrate 110, and the color conversion layers 340R and 340G may be disposed between the blue light cutting filter 322 and the first substrate 110.

The first color conversion layer 340R may convert blue light supplied from the light assembly 500 into red, and the second color conversion layer 340G may convert blue light supplied from the light assembly 500 into green. To covert blue light, the first color conversion layer 340R and the second color conversion layer 340G may include one of the phosphor or the quantum dot.

The third color conversion layer 340B is made of a transparent polymer, and the blue light supplied from the light assembly 500 is transmitted to represent blue. The third color conversion layer 340B corresponding to the region emitting blue light includes the material emitting incident blue light with a separate florescent or quantum dot (as one example, the polymer such as the photosensitive resin).

The plurality of color conversion layers 340R, 340G, and 340B may be formed by exposing and developing the negative type photosensitive resin, and the cross section of the plurality of color conversion layers 340R, 340G, and 340B is a reverse tapered shape. The plurality of color conversion layers 340R, 340G, and 340B are insoluble.

Next, the band pass filter 350 is disposed between the substrate 310 the first substrate 110.

The assistance metal layer 362 is disposed between the band pass filter 350 (e.g., a bottom surface of the band pass filter 350) and the first substrate 110, and is disposed between respective adjacent ones of the color conversion layers 340R, 304G, and 340B. The assistance metal layer 362 may be a metal material reflecting light, and again reflects the light emitted in the direction of the assistance metal layer 362 to the direction of the color conversion layers 340R, 340G, and 340B, thereby increasing the amount of light emitted to the user.

Next, the light blocking member 372 is disposed between the band pass filter 350 (e.g., beneath the assistance metal layer 362) and the first substrate 110, and is disposed between respective ones of the plurality of color conversion layers 340R, 340G, and 340B. As shown in FIG. 8, the light blocking member 372 defines regions corresponding to the first color conversion layer 340R, the second color conversion layer 340G, and the third color conversion layer 340B.

The cross section of the light blocking member 372 may be normally tapered, and the upper surface of the light blocking member 372 may be slightly concave.

The light blocking member 372 may be soluble. This is the reason that the light blocking member 372 is formed by ashing the negative type light blocking photosensitive resin without the additional exposure and developing. That is, the light blocking photosensitive resin does not include the crosslinking due to the exposure.

Next, the planarization layer 250 providing the flat surface may be disposed between the band pass filter 350 and the first substrate 110, and the common electrode 270 is disposed between the planarization layer 250 and the first substrate 110. According to the exemplary embodiment of the invention, the planarization layer 250 may be omitted.

The common electrode 270 receiving the common voltage forms the electric field with the pixel electrode 191, and arranges liquid crystal molecules 31 in the liquid crystal layer 3.

The liquid crystal layer 3 includes the plurality of liquid crystal molecules 31, and the arrangement direction of the liquid crystal molecules 31 is controlled by the electric field between the pixel electrode 191 and the common electrode 270. According to the arrangement of the liquid crystal molecules 31, transmittance of light received from the light assembly 500 may be controlled to display an image.

The above-described display device according to an exemplary embodiment of the present invention does not includes the upper panel 200 shown in FIG. 4, and the color conversion panel 30 replaces the function and position of the upper panel. This display device provides a device that is thinner, and that has a reduced cost and weight.

Figure 9:
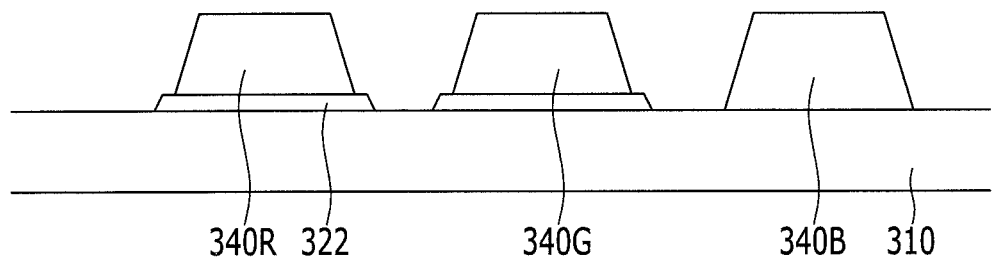
FIG. 9, FIG. 10, and FIG. 11 are cross-sectional views of a color conversion panel according to an exemplary embodiment of a manufacturing process.
Figure 10:
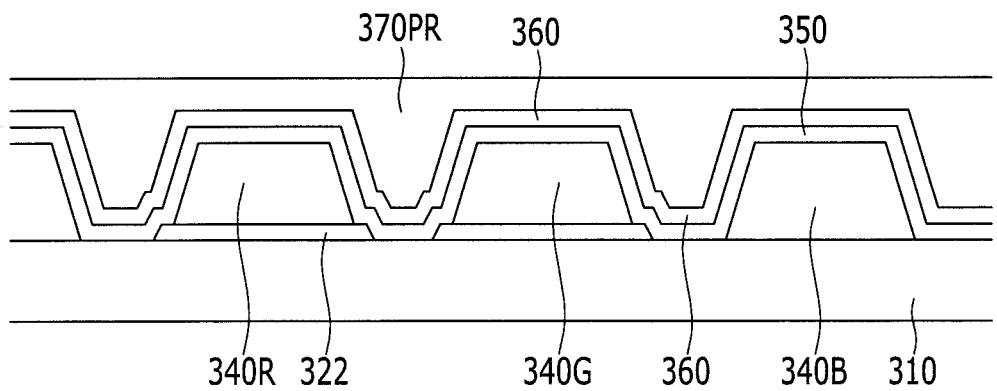
Figure 11:
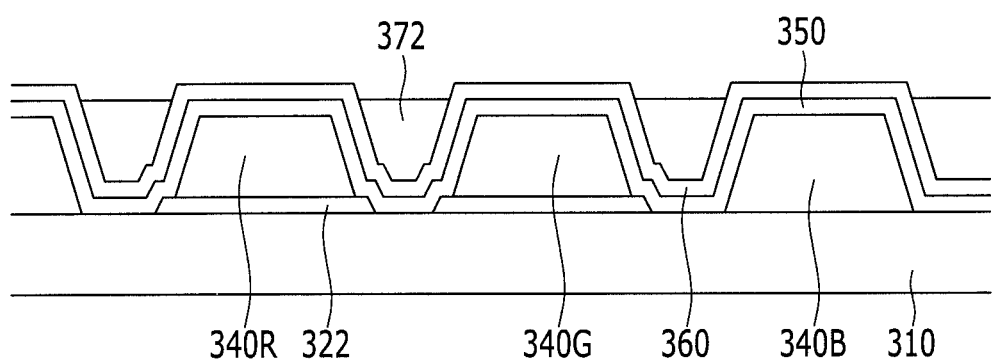

Next, the manufacturing process of the color conversion panel according to an exemplary embodiment of the present invention will be described with reference to FIG. 9, FIG. 10, and FIG. 11. FIG. 9, FIG. 10, and FIG. 11 are cross-sectional views of a color conversion panel according to an exemplary embodiment of a manufacturing process.

First, as shown in FIG. 9, a blue light cutting material layer is coated on an entire area on the substrate 310 to form the blue light cutting filter 322 disposed on the substrate 310 by using a first mask.

Next, the first color conversion layer 340R and the second color conversion layer 340G, which are disposed on the blue light cutting filter 322, and the third color conversion layer 340B, which is disposed on the substrate 310, are formed by using a second, third, and fourth masks.

Then, as shown in FIG. 10, the band pass filter 350 and a metal material layer 360 are sequentially deposited on the substrate 310 and on the plurality of color conversion layers 340R, 340G, and 340B. As a modified exemplary embodiment, at least one of the band pass filter 350 and the metal material layer 360 may be omitted.

Next, a light blocking photosensitive resin 370PR is coated on the metal material layer 360.

Next, as shown in FIG. 11, the light blocking photosensitive resin 370PR is ashed to form the light blocking member 372. In this case, according to the ashing process, the upper surface of the light blocking member 372 may be slightly concave.

Also, the metal material layer 360 exposed through the ashing of the light blocking photosensitive resin may be removed through the etching. As shown in FIG. 1, the etched metal material layer forms the assistance metal layer 362. That is, according to the above-described process, the color conversion panel 30 shown in FIG. 1 may be formed.

In the manufacturing method of the above-described color conversion panel, because the color conversion panel is manufactured by using four masks, the cost and required time for the manufacturing process may be reduced. Also, because the light blocking member is formed equal to the height formed by the color conversion layer, the mixing of color generated between the color conversion layers may be reduced or prevented.

Figure 12:
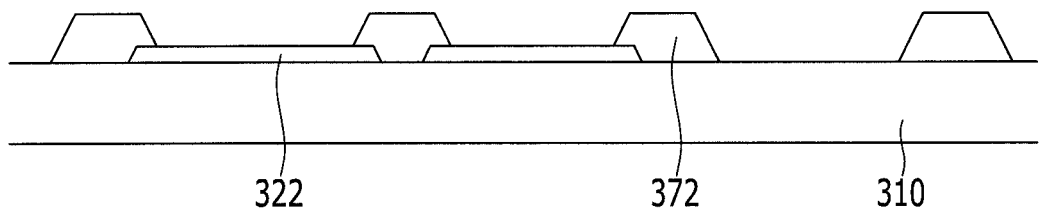
FIG. 12, FIG. 13, and FIG. 14 are cross-sectional views of a color conversion panel according to an exemplary embodiment of a manufacturing process.
Figure 13:
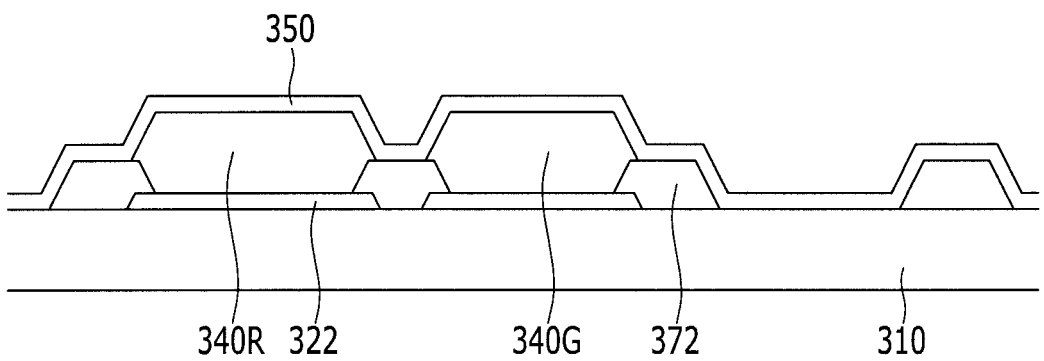
Figure 14:
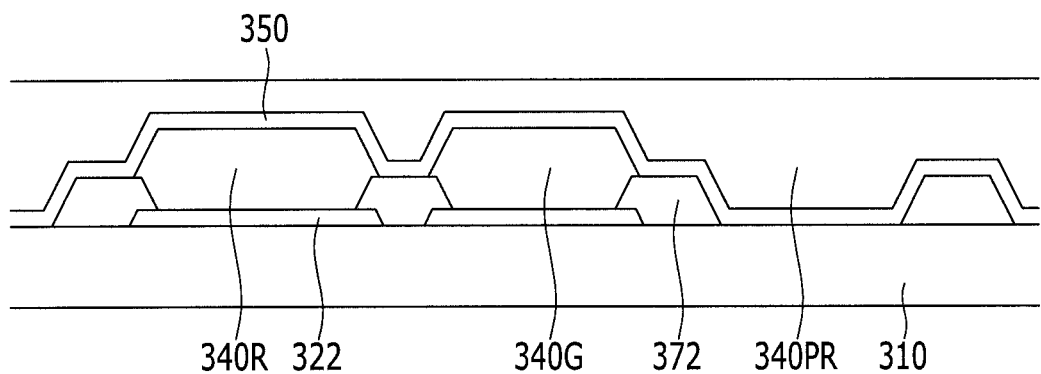

Next, the manufacturing method of the color conversion panel according to an exemplary embodiment of the present invention will be descried with reference to FIG. 12, FIG. 13, and FIG. 14. FIG. 12, FIG. 13, and FIG. 14 are cross-sectional views of a color conversion panel according to an exemplary embodiment of a manufacturing process.

First, as shown in FIG. 12, the blue light cutting material layer is coated over the entire area on the substrate 310 to form the blue light cutting filter 322 on the substrate 310 by using a first mask.

Next, the light blocking member 372 is formed on the substrate 310, for defining the plurality of color conversion layers 340R, 340G, and 340B, by using a second mask.

Next, as shown in FIG. 13, the first color conversion layer 340R and the second color conversion layer 340G separately disposed on the blue light cutting filter 322 are respectively formed by using third and fourth masks.

Next, the band pass filter 350 is deposited in the entire area on the substrate 310, on the light blocking member 372, and on the first and second color conversion layers 340R and 340G. According to an exemplary embodiment, a metal material layer 360 disposed on the band pass filter 350 may be included or omitted.

Next, referring to FIG. 14, the color conversion resin 340PR is thickly coated on the band pass filter 350 or on the metal material layer 360. Then, the color conversion resin 340PR is ashed to be the third color conversion layer 340B to form the color conversion panel 30 shown in FIG. 2.

In the present specification, the exemplary embodiment forming the third color conversion layer 340B through ashing is described, although the present invention is not limited thereto, and first and third color conversion layers may be formed through exposure and developing, and the second color conversion layer may be formed through ashing, or, alternatively, the second and third color conversion layers may be formed through exposure and developing, and the first color conversion layer may be formed through ashing.

On the other hand, the method for forming the third color conversion layer 340B is not limited to the above-described manufacturing method of FIG. 14, and the method performing the exposure on the rear surface of the substrate 310 may be applied.

First, the above-described manufacturing process, with the exception of the ashing process of the color conversion resin 340PR, is performed in the same manner. Then, if the exposure is performed on the rear surface of the substrate 310, and if the color conversion resin 340PR is developed, it is possible to form the color conversion panel 30 shown in FIG. 2.

In detail, when irradiating ultraviolet rays in the rear surface of the substrate 310, the blue light cutting filter 322 overlapping the first and second color conversion layers 340R and 340G reduces or prevents the irradiated ultraviolet rays. That is, the color conversion resin 340PR position, while overlapping the first and second color conversion layers 340R and 340G, maintains solubility. Meanwhile, the color conversion resin 340PR becomes insoluble by the exposure process at the region where the blue light cutting filter 322 is not disposed.

Accordingly, if the developing process is performed for the color conversion resin 340PR exposed through the rear surface exposure, the third color conversion layer 340B may be formed.

In summary, the manufacturing method of the above-described color conversion panel manufactures the color conversion panel by forming four masks, thereby reducing the cost and the time required for the manufacturing process.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A color conversion panel comprising:
   a substrate;
   first, second, and third color conversion layers on the substrate, each of the first, second, and third color conversion layers being configured to emit light of a different color from each other; and
   a light blocking member between adjacent ones of the first, second, and third color conversion layers,
   a continuous band pass filter over an entire area of the substrate and between the light blocking member and the first color conversion layer,
   wherein any one of the first, second, and third color conversion layers and the light blocking member is soluble, and the remaining ones are insoluble, and
   wherein an upper surface of the band pass filter with respect to the substrate is coplanar with an upper surface of the light blocking member with respect to the substrate.

2. The color conversion panel of claim 1, wherein a material of at least some of the first, second, and third color conversion layers and the light blocking member comprises a negative type photosensitive resin, and
   wherein the light blocking member is soluble.

3. The color conversion panel of claim 2, further comprising:
   the band pass filter on the first, second, and third color conversion layers; and
   an assistance metal layer on the band pass filter and overlapping the light blocking member.

4. The color conversion panel of claim 1, wherein a material of the first, second, and third color conversion layers and the light blocking member comprises a negative type photosensitive resin, and
   wherein the third color conversion layer is soluble.

5. The color conversion panel of claim 4, wherein the band pass filter is over the first and second color conversion layers and is under the third color conversion layer.

6. The color conversion panel of claim 1, further comprising a blue light cutting filter on the substrate, and overlapping the first color conversion layer and the second color conversion layer.

7. A display device comprising:
   a display panel; and
   a color conversion panel on the display panel and comprising:
   a substrate;
   first, second, and third color conversion layers between the display panel and the substrate and configured to emit differently colored light;
   a light blocking member between respective adjacent ones of the first, second, and third color conversion layers; and
   a continuous band pass filter over an entire area of the substrate and between one or more of the first, second, and third color conversion layers and the display panel, and between the remaining first, second, and third color conversion layers and the substrate,
   wherein any one of the first, second, and third color conversion layers and the light blocking member is soluble, and the remaining ones are insoluble.

8. The display device of claim 7, wherein a material of at least some of the first, second, and third color conversion layers and the light blocking member comprises a negative type photosensitive resin, and
   wherein the light blocking member is soluble.

9. The display device of claim 8, wherein the color conversion panel further comprises:
   an assistance metal layer between the band pass filter and the display panel and overlapping the light blocking member.

10. The display device of claim 7, wherein a material of at least some of the first, second, and third color conversion layers and the light blocking member comprises a negative type photosensitive resin, and
    wherein the third color conversion layer is soluble.

11. The display device of claim 7, further comprising a blue light cutting filter between the substrate and the display panel, and overlapping the first color conversion layer and the second color conversion layer.

12. A method for manufacturing a color conversion panel, the method comprising:
    forming first, second, and third color conversion layers on a substrate, each of the first, second, and third color conversion layers being configured to emit light of a different color from each other,
    coating a light blocking photosensitive resin on the first, second, and third color conversion layers,
    ashing the light blocking photosensitive resin to form a light blocking member, and
    forming a continuous band pass filter over an entire area of the substrate and disposed between the light blocking member and the first color conversion layer,
    wherein an upper surface of the band pass filter with respect to the substrate is coplanar with an upper surface of the light blocking member with respect to the substrate, and
    wherein the first, second, and third color conversion layers are insoluble and the light blocking member is soluble.

13. The method of claim 12, wherein a material of the first, second, and third color conversion layer and the light blocking member comprises a negative type photosensitive resin.

14. The method of claim 12, further comprising at least one of:
    forming the band pass filter on the first, second, and third color conversion layers; and
    forming an assistance metal layer on the first, second, and third color conversion layers.

15. The method of claim 12, further comprising forming a blue light cutting filter on the substrate, and overlapping the first and second color conversion layers.

16. A method for manufacturing a color conversion panel, the method comprising:
    forming a light blocking member on a substrate;

forming a first color conversion layer and a second color conversion layer between respective portions of the light blocking member;

coating a color conversion resin on the substrate, on the light blocking member, on the first color conversion layer, and on the second color conversion layer;

ashing the color conversion resin to form a third color conversion layer; and forming a continuous band pass filter over an entire area of the substrate and above one or more of the first, second, and third color conversion layers, and below the remaining first, second, and third color conversion layers, and wherein the light blocking member, the first and second color conversion layers are insoluble and the third color conversion layer is soluble.

17. The method of claim 16, wherein the color conversion resin comprises a negative type photosensitive resin.

18. The method of claim 16, further comprising:
forming a blue light cutting filter on the substrate and overlapping the first color conversion layer and the second color conversion layer.

19. The method of claim 16, further comprising forming the band pass filter on the light blocking member, on the first color conversion layer, and on the second color conversion layer.

* * * * *